Dec. 4, 1923. 1,476,486
R. P. BROWN ET AL
OPTICAL PYROMETER
Filed June 24, 1919 2 Sheets-Sheet 1
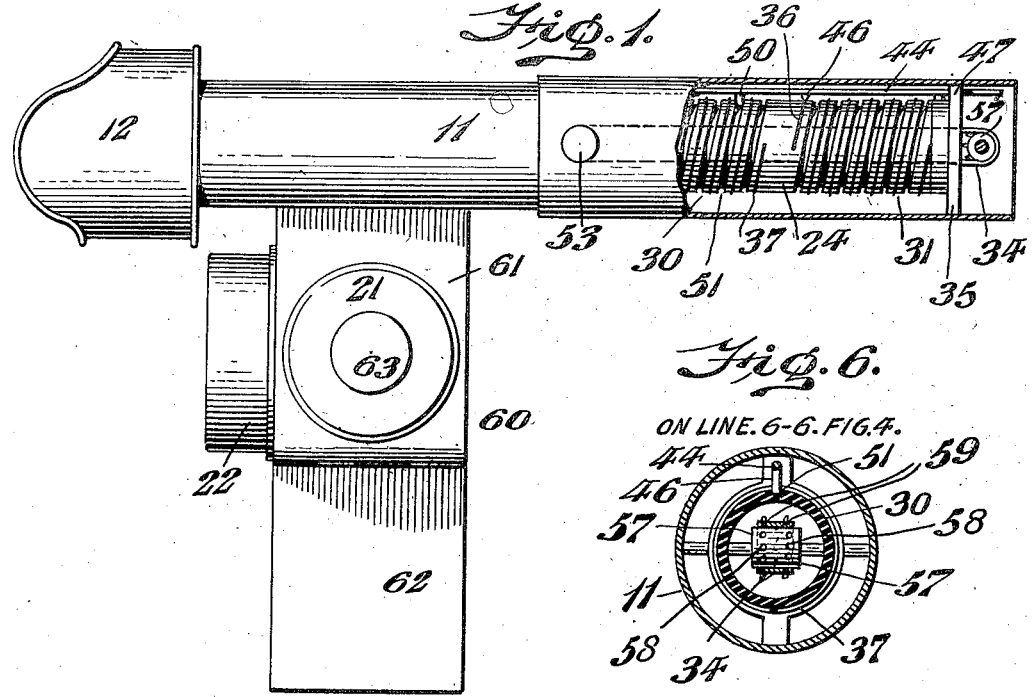
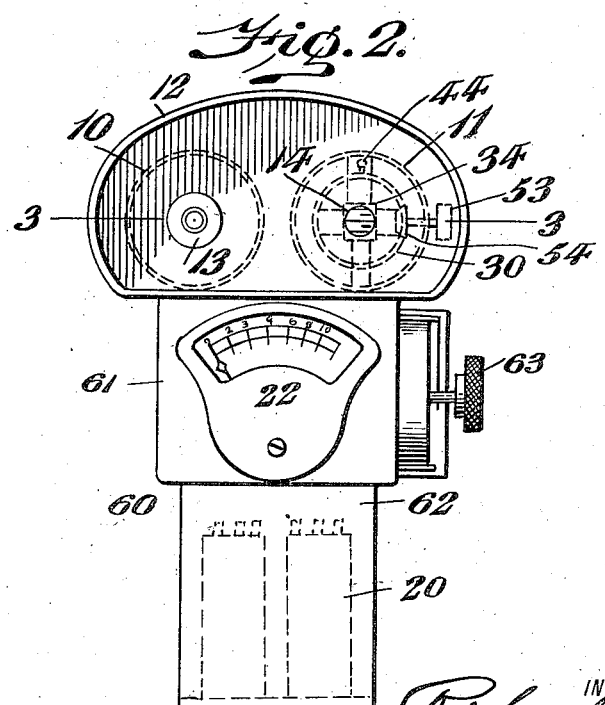
INVENTOR
Richard P. Brown.
Charles P. Frey.
BY
Robert M. Barr.
ATTORNEY.

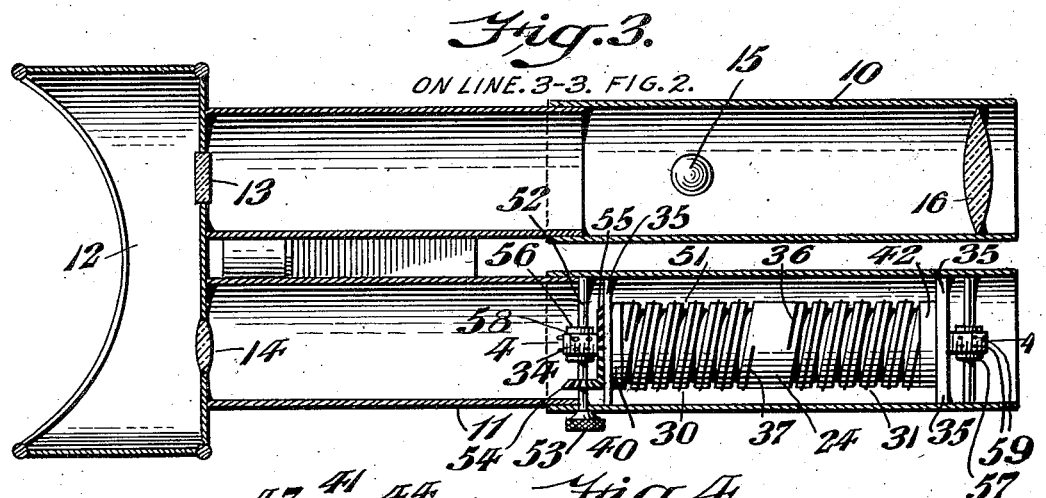
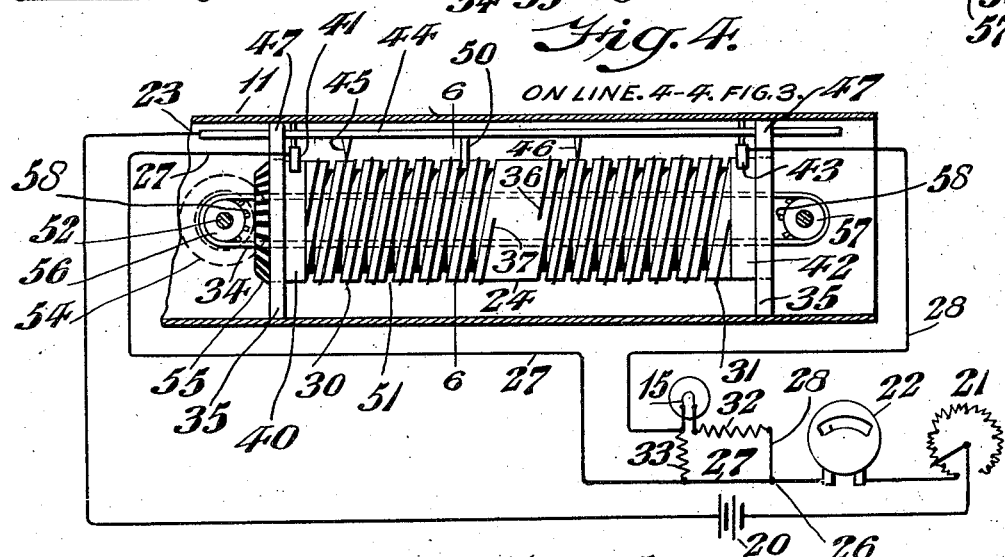
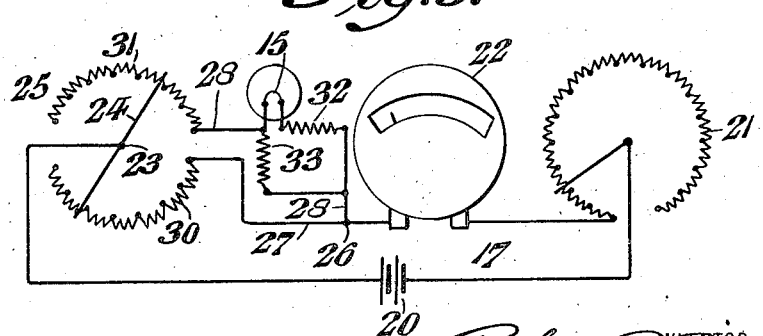

Patented Dec. 4, 1923.

1,476,486

UNITED STATES PATENT OFFICE.

RICHARD P. BROWN AND CHARLES P. FREY, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

OPTICAL PYROMETER.

Application filed June 24, 1919. Serial No. 306,410.

*To all whom it may concern:*

Be it known that we, RICHARD P. BROWN and CHARLES P. FREY, citizens of the United States, and residents of the city of Philadelphia, county of Philadelphia, State of Pennsylvania, have invented certain new and useful Improvements in Optical Pyrometers, of which the following is a specification.

Some of the objects of the present invention are: to provide an optical pyrometer with means for reading temperature equivalents without removing the instrument from its operative position; to provide means to standardize a current so that its value has a direct relation to the indications of a temperature equivalent scale; to provide means for varying the light standard of an optical pyrometer and simultaneously maintain the current constant; to provide means for maintaining an electrical balance in an optical pyrometer; to provide means for synchronizing the movement of a movable scale with respect to the movement of an element by which the intensity of the standardizing light is varied; to provide means for eliminating minor errors due to differences between different light standards of the same type, where one is substituted for the other in an optical pyrometer; and to provide other improvements as will hereinafter appear.

In the accompanying drawings, Fig. 1 represents a side elevation, in part section, of one form of optical pyrometer embodying the present invention; Fig. 2 represents an end elevation of the same; Fig. 3 represents a top plan, in part section, of the pyrometer of Fig. 1; Fig. 4 represents an enlarged fragmentary detail of the compensating rheostat shown in part in Fig. 1; Fig. 5 represents a diagram of one form of electric circuit arranged for use with the instrument of Fig. 1; and Fig. 6 represents a section on line 6—6 of Fig. 4.

Referring to the drawings, one form of an optical pyrometer embodying the present invention is shown comprising generally an inspection tube 10, a data indicating tube 11, and an eye shield 12 to which the tubes 10 and 11 are rigidly secured in such manner that one of the tubes is arranged for use with one eye of an observer and the other tube for use with the other eye of the observer. Suitable sight openings 13 and 14 are provided in the shield 12 and preferably aline respectively with the axes of the respective tubes 10 and 11. The sight opening 13 of the inspection tube 10 is preferably of glass or other suitable material, colored red, in order to eliminate color comparison and to establish comparison by the intensity of light. The standard of comparison, in the present instance, is a lamp or lamp filament 15, duly standardized and located within the inspection tube 10 in proper relation to a lens 16 in order to be superimposed upon an image of the object upon which the inspection tube is focused.

For the purpose of energizing the lamp or lamp filament 15 and bringing it to incandescence, as desired, the filament 15 is in a circuit 17, including a battery 20 or other suitable source of current, a rheostat 21, and an ammeter 22 or any other instrument from which current values may be determined. The foregoing circuit elements are arranged in series, though it will be understood that proper circuit connections are to be made for substituted instruments, say, for example, replacing the ammeter 22 by a voltmeter when a multiple circuit is required. The rheostat 21 serves as a means for maintaining a constant current in the circuit 17 and it may be adjusted at will to give the predetermined reading on the indicating meter 22.

In order to vary the current flowing through the filament 15 to give different light intensity, either for a predetermined operation or for matching intensity with an incandescent body, the circuit 17 has a terminal 23 connected to the movable element 24 of a compensating rheostat 25, and a terminal 26 connected by branch leads 27 and 28, which are respectively joined to two separate series of coils 30 and 31 which form the resistance elements of the compensating rheostat 25. The branch lead 28 includes the lamp filament 15 as will hereinafter be explained. By reference to Fig. 5 it will be evident, as the movable element 24 of the compensating rheostat moves in a clockwise direction, that the intensity of the filament light 15 will be increased owing to the divided circuit, wherein the series of coils 31 becomes less while the series of coils 30 becomes greater; on the other hand a counter-clockwise movement of the element 24 introduces more resistance coils 31 into the lamp branch 28 and in the same proportion cuts out resistance from the coils 30 and consequently the intensity of the filament light is diminished.

As a means for eliminating error due to differences in filaments of different lamps of the same kind it is preferable to introduce a current factor whereby the constant current is from a source greater than necessary for the ordinary light comparison tests. This is accomplished, in the present instance, by introducing a resistor 32 in series with the lamp filament 15 and a second resistor 33 in multiple with the lead 28 and in shunt with the filament 15. Thus, for example, if the lamp filament 15, when directly connected, consumes 0.5 ampere at 1.5 volt or 0.75 watt, it is evident by inserting the resistor 33, which is adjusted to have the same resistance as the lamp plus the resistor 32, that the total current must be doubled since half of it flows through the resistor 33. With the introduction of the series or line resistor 32 the potential at the terminals of the circuit 17 will have to be increased in order to overcome the added resistance of resistor 32 and supply enough current to properly energize the lamp. From the foregoing it will therefore be apparent that an E. M. F. and a current can be selected which will suffice for all lamps of the type to be used, irrespective of any small differences in them and operated from a source having the same potential difference.

A feature of the present invention is to provide means for directly indicating temperatures or temperature equivalents as determined by light comparison through the medium of the lamp filament 15, and to that end the indicating tube 11 is arranged to locate a scale 34 in visible relation with respect to the sight opening 14. This scale 34 is subdivided into degrees of temperature or any other suitable equivalents and is arranged to move in synchronization with the adjusting movements of the compensating rheostat 25, the two having a definite fixed relation so that in any position of the rheostat 25 the scale will register the corresponding heat equivalent opposite the sight opening 14. One form of compensating rheostat for providing a compact portable instrument comprises a tubular cylindrical open ended movable element of fibre or any other suitable insulating material, mounted for rotary movement within the indicating tube 11, preferably being supported at its ends in fixed collar bearings 35 carried by the tube 11; the said element being indicated by reference numeral 24 to correspond with the diagram of Fig. 5. Circumferentially of the movable element 24 the two separate series of resistance coils 30 and 31 are spirally wound and have the same pitch, the one being preferably adjacent one end of the element 24 and the other adjacent the other end of the element 24 and both terminating intermediate the ends of the element 24 as indicated at 36 and 37. The outer end of the series of coils 30 is electrically bonded to a commutator ring 40 upon which a terminal brush 41 is arranged to bear for surface contact, the said brush 41 having connection with the lead 27 of the circuit 17. The outer end of the series of coils 31 is electrically bonded to a commutator ring 42 upon which a terminal brush 43 is arranged to bear for surface contact and the branch 28 of the lamp 15 is connected to the said brush 43.

For completing the divided circuit 17 through the two series of coils 30 and 31, or through parts of each series, a traveller bar 44 is provided having fixed thereto two contacts 45 and 46 arranged respectively to contact with the two series of coils 30 and 31 and so spaced with respect to each other that equal resistances of each series 30 and 31 are cut in or cut out of the circuit 17 as the contacts 45 and 46 follow the movement of the rotary element 24. The traveller bar 44 is mounted for sliding movement linearly parallel to the longitudinal axis of the rotary element 24 and suitable fixed bearing supports 47 are secured to the tube 11 for properly guiding the bar 44 in its movement. The traveller bar 44 forms the terminal 23 of the circuit 17 and the current traversing the bar 44 divides and returns by way of the parts of the two series of coils 30 and 31 which are in the circuit.

For causing the traveller bar 44 to move across the movable element in a manner to maintain the two contacts 45 and 46 always in contact with the respective coils 30 and 31, a guide or leader finger 50 is rigidly secured to the bar 44 and is arranged to extend within a circumferential spiral groove 51 which has the same pitch as the two coils 30 and 31. Thus as the movable element 24 is rotated or turned about its axis, the contacts 45 and 46 travel linearly and each maintains contact with its resistance coil, thereby varying the resistance of the two branches of the circuit but maintaining a constant current in the main circuit.

In order to rotate or turn the movable element 24 as desired for the purpose of adjusting the lamp intensity, a shaft 52 is suitably mounted for rotation upon the tube 11 and projects laterally therefrom, at a convenient point, to receive a thumb-wheel 53 which is fixed thereon and is arranged to be manually manipulated. Within the tube 11 the shaft 52 is provided with a mitre gear 54 fast to the shaft 52 and in mesh with a like gear 55 fixed to the end of the movable element 24 so that by turning the thumb-wheel 53 the movable element 24 is turned or rotated about its axis while simultaneously the leader finger 50, under the action of the groove 51, causes the bar 44 to shift the contacts 45 and 46 along their respective coils 30 and 31.

For synchronizing the movement of the scale 34 with the movement of the element 24, the shaft 52 carries a feed roller 56 keyed thereon and of a diameter calculated to advance the scale 34 at a speed so proportioned with respect to the turning movement of the element 24 that for any position of the element 24 corresponding to a given light intensity, the scale 34 will be in a position to locate the proper corresponding temperature or other value opposite the sight opening 14. In the present instance, the scale 34 is in the form of a continuous ribbon or belt the rear end of which is supported by and travels around a movable roller 57 suitably mounted for free rotation transversely of the tube 11. To prevent displacement of the scale 34 from its fixed relation with the element 24 the feed roller 56 is provided with a plurality of pins, forming substantially two sprockets 58, which are arranged to engage two series of perforations 59 in the respective side edges of the scale ribbon. This maintains the scale 34 properly alined, prevents relative movement between it and its feed rollers and maintains the desired synchronization between the scale 34 and the movable element 24. It will be understood, however, that the foregoing is only one form of construction shown by way of example and that the invention is not to be restricted to the exact details shown.

In the operation of the apparatus the circuit 17 is closed in any suitable manner and placed in balance by adjusting the rheostat 21 to give a predetermined current value as indicated by the ammeter 22 and the instrument may then be sighted upon the incandescent body the temperature of which is desired. The intensity of the lamp filament 15 is then varied, to obtain the comparison value, by turning the thumb-wheel 53 for the purpose of rotating the movable element 24. Assuming the brilliancy of the lamp filament 15 is to be increased, the thumb-wheel 53 is so manipulated as to cause the movable element 24 to turn in a clockwise direction and thereby feed the traveller bar 44 to the right as viewed in Fig. 4. This action results in the contact 45 cutting in resistance of the coils 30 in the main circuit 17 and cutting out an equal resistance from the coils 31 in the lamp circuit and consequently the lamp brilliancy is increased while the current in circuit 17 remains unchanged and is always constant irrespective of the movements of the traveller bar 44 of the rheostat 25. The movement of the rheostat element 24 is translated to the scale 34, which moves in synchronization, as heretofore explained, and comes to rest when the element 24 stops. Since the movable element 24 is brought to rest at the moment the image and filament 15 are merged, it is obvious that the scale 34 will then be in position to indicate the equivalent heat value of the scale 34 in juxtaposed relation to the sight opening 14 and a direct reading is then made.

In instruments of the character as heretofore constructed and employed it has been necessary to provide a heavy, cumbersome current measuring instrument which is carried by the user, so that after a comparison reading the sighting instrument must be removed in order that the user can take a reading from the separate carried instrument. Following this reading, which is open to error because of the time interval lost, the user must refer to a table of values in equivalents to obtain the sought for temperature reading which has only been partially determined by the second step. That is to say, in such an instrument it is necesary to first complete a comparison test, second make a current value reading, and third search out the temperature equivalent from a table of prepared values.

In the instrument of the present invention the entire device is in one compact portable body so arranged and constructed that the errors due to a sequence of steps or operations are eliminated and wherein the final temperature value is not only read direct from the instrument but can be read at the instant of and simultaneously with the light comparison operation.

In assembling the instrument with a view to portability and handy operation, the sighting elements are secured in any suitable manner to a case 60, which is arranged to provide a pair of compartments 61 and 62, in one of which, say 61, the ballast rheostat 21 is mounted and has an operating thumb-nut 63 for adjusting purposes, while in the other compartment 62 the battery or batteries 20 may be located. The current meter 22 may be secured to the front of the case 60 in an accessible position for taking readings therefrom.

Although only a single form is shown in which this invention may be embodied, it is to be understood that the invention is not limited to any specific construction, but might applied in various forms without departing from the spirit of the invention or the scope of the appended claims.

Having thus fully described our invention, we claim and desire to protect by Letters Patents:

1. In an optical pyrometer comprising in combination, a light standard, a rheostat arranged to vary the intensity of said standard, a scale representing temperatures or temperature equivalents having a calibrated relation with respect to said rheostat, said light standard and said scale being simultaneously visible, and means to move said scale and rheostat in synchronism.

2. In an optical pyrometer comprising in combination a light standard, a rheostat arranged to vary the intensity of said standard, a scale representing temperatures or temperature equivalents having a calibrated relation with respect to said rheostat, said light standard and said scale being simultaneously visible, means to move said scale and rheostat in synchronism, and means to maintain substantially an electrical balance in the circuit including said rheostat.

3. In an optical pyrometer, the combination of a casing, a light standard, electrical means for causing said light standard to merge in appearance with a substance under test, a temperature or a temperature equivalent scale located within said casing, means for causing said scale to indicate temperature or temperature equivalents of the substance under test, means in said casing for viewing the test substance with respect to said light standard, and means in said casing for simultaneously observing said light standard and said scale.

4. In an optical pyrometer, the combination of a casing provided with an opening through which a test substance may be viewed, a light standard operatively located with respect to said opening, electrical means for causing said light standard to merge in appearance with said test substance, a temperature or temperature equivalent indicating means located within said casing, and means for synchronously operating said light standard merging means and said indicating means, whereby temperature values can be simultaneously read while making a comparison test.

5. In an optical pyrometer, the combination of a tubular casing a light standard operatively located in said casing for comparison with a substance under test, electrical means for causing said light standard to merge in appearance with said test substance, a temperature or temperature equivalent scale movably mounted within said casing and arranged to be simultaneously visible with said light standard, and means for synchronously operating said light standard merging means and said scale, whereby temperature values can be simultaneously read while making a comparison test.

RICHARD P. BROWN,
CHARLES P. FREY.